(12) United States Patent
Wu

(10) Patent No.: US 7,374,433 B2
(45) Date of Patent: May 20, 2008

(54) PORTABLE COMPUTER

(75) Inventor: Chia-Teng Wu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 11/617,740

(22) Filed: Dec. 29, 2006

(65) Prior Publication Data

US 2007/0167039 A1    Jul. 19, 2007

(30) Foreign Application Priority Data

Jan. 17, 2006   (CN) ..................... 2006 1 0001422

(51) Int. Cl.
*H01R 12/00* (2006.01)
(52) U.S. Cl. .................. 439/76.1; 439/170; 361/683
(58) Field of Classification Search .............. 439/76.1, 439/170, 171; 361/680, 683
See application file for complete search history.

(56) References Cited

U.S. PATENT DOCUMENTS 7,150,644 B2 * 12/2006 Behl ........................ 439/374

7,211,743 B1 *  5/2007 Dorsett ...................... 174/545
7,259,970 B2 *  8/2007 Nakayabu ................... 361/810
2006/0028793 A1 *  2/2006 Na et al. .................... 361/683
2006/0268502 A1 * 11/2006 Liu et al. .................... 361/683

* cited by examiner

*Primary Examiner*—Hien Vu
(74) *Attorney, Agent, or Firm*—Jianq Chyun IP Office

(57) ABSTRACT

A portable computer including a housing, a first circuit board and a rotating element is provided. The housing has a first opening and a second opening. The first circuit board with a first connector and a second connector is disposed in the housing. The first connector and the second connector are disposed on the circuit board. In addition, the rotating element has a first portion and a second portion, wherein the first portion is pivoted to the housing, and a part of the first portion passes through the first opening to be exposed outside the housing. The second portion is fixed to the first circuit board. The first circuit board rotates with the rotating element relative to the housing.

10 Claims, 6 Drawing Sheets

PORTABLE COMPUTER

CROSS-REFERENCE TO RELATED APPLICATION

This application claims the priority benefit of P.R.C. application serial no. 200610001422.6, filed Jan. 17, 2006. All disclosure of the Chinese application is incorporated herein by reference.

BACKGROUND OF THE INVENTION

1. Field of Invention

The present invention relates to a portable computer, and more particularly, to a portable computer having sufficient connectors.

2. Description of Related Art

With advance of science and technology, the volume of electronic products tends to be light, thin, and compactness to meet the users' demand for easy and convenient portability. For example, a processor for processing mass information and data has been evolved from a large-scale calculating center into a personal computer (PC), and then further into a notebook computer.

General speaking, in addition to providing text-processed and video-watching capability, the notebook computer is also a potent tool as presenting users' proposal for customers as a result of its advantage of easy portability. However, the notebook computer must be provided with different connection ports for being connected to different outside devices for different purposes. For example, when processing text or presenting their proposal for customer, the users may need the following connection ports: a removable media connection port for an external floppy drive or optical drive, a parallel port for a printer, a serial port for a mouse or MODEM, an RJ-45 port for a local area network, a D-sub video output port or S-terminal port for an external display device, etc. As the notebook computer must be provided with some necessary accessories such as battery, hard disc, connector and optical drive, etc. within the same limited volume, and a hot gas exhaust is required to be disposed at its side to facilitate the heat dissipation generated from CPU, the quantity and varieties of the ports are limited and not convenient for the customers.

SUMMARY OF THE INVENTION

Accordingly, the present invention is directed to provide a portable computer, which has sufficient ports for users' usage.

To achieve the above or other aspects, the present invention provides a portable computer, including a housing, a first circuit board and a rotating element. The housing of the portable computer has a first opening and a second opening. The first circuit board with a first connector and a second connector is disposed in the housing. The first connector and the second connector are located on the first circuit board. In addition, the rotating element has a first portion and a second portion, wherein the first portion is pivoted to the housing, and a part of the first portion passes through the first opening. The second portion is fixed to the first circuit board, and the first circuit board rotates with the rotating element relative to the housing. When the rotating element is located at a first position, the first connector is located in the second opening. When the rotating element is located at the second position, the second connector is located in the second opening.

According to one embodiment of the present invention, the second opening is disposed at the side surface of the housing.

According to one embodiment of the present invention, the second portion further includes a first joint, and the first joint is fixed in the first circuit board.

According to one embodiment of the present invention, the portable computer further includes a locking element, disposed on the housing, wherein the locking element can shift between an unlocked position and a locked position by force, when the locking element is located at the locked position, the locking element may lock the rotation element to preventing it from rotating.

According to one embodiment of the present invention, the locking element is slidably disposed on or pivoted to the housing.

According to one embodiment of the present invention, the portable computer further includes an internal frame disposed in the first circuit board, and the internal frame surrounds the first connector and the second connector, and has a first window and a second window respectively for exposing a first connection plug of the first connector and a second connection plug of the second connector.

According to one embodiment of the present invention, the internal frame is conductive and electrically connected with the grounded terminal of the first circuit board.

According to one embodiment of the present invention, the portable computer further includes a second circuit board disposed in the housing, and the second circuit board is electrically connected to the first circuit board.

According to one embodiment of the present invention, the portable computer further includes a transmission cable disposed in the housing, and the second circuit board is electrically connected to the first circuit board through the transmission cable.

According to one embodiment of the present invention, the first connector and the second connector are respectively disposed at a first side and a second side of the first circuit board, and the first side is perpendicular to the second side.

The connector is arranged at the side of the circuit board and disposed in the housing of the portable computer, according to the present invention, so that users can select a desired connector by rotating the first circuit board using the rotating element, therefore, compared with conventional portable computer, the portable computer of the present invention can provide more quantity and varieties of connectors for the users' selection.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
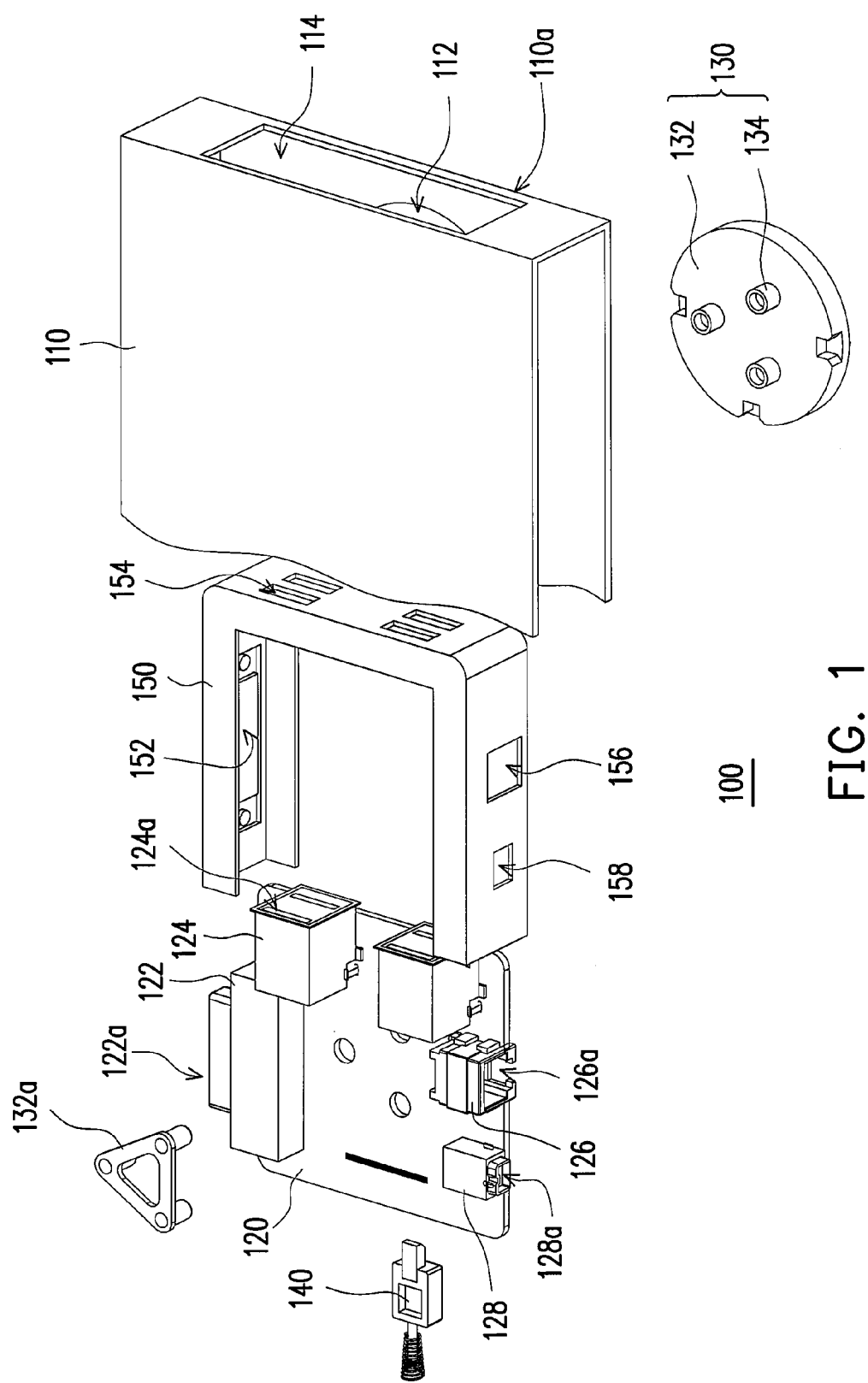
FIG. 1 is a partly exploding view of a portable computer according to one embodiment of the present invention.
Figure 2:
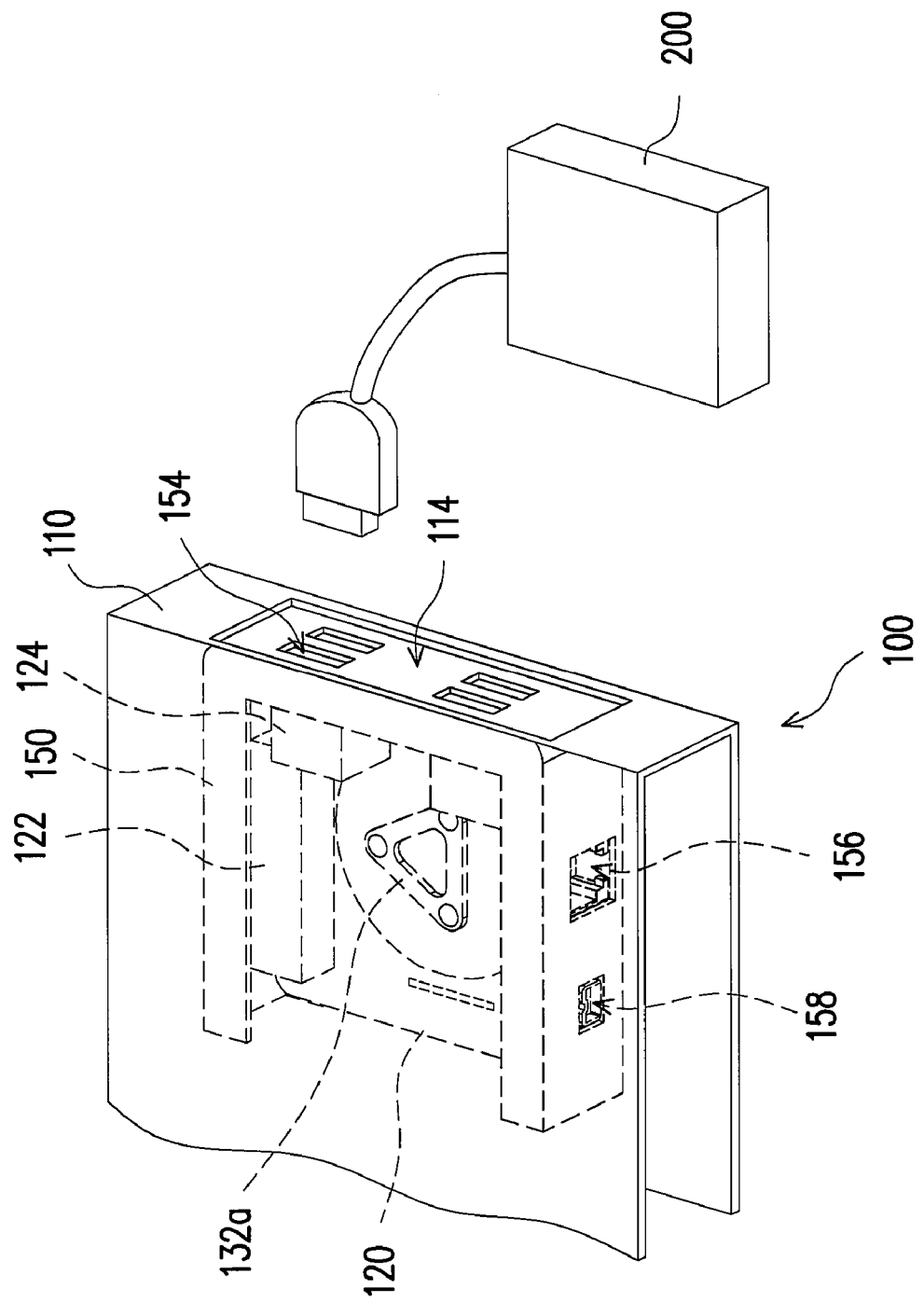
FIG. 2 is a partly assembled diagram of the portable computer shown in FIG. 1.

FIG. 1 is a part exploding view of a portable computer according to one embodiment of the present invention, and FIG. 2 is a partly assembled diagram of the portable computer in FIG. 1. Referring to FIG. 1 and FIG. 2, the portable computer 100 may be a notebook computer or other portable computer requiring multiple connection ports. The portable computer 100 includes a housing 110, a first circuit board 120, and a rotating element 130. In the embodiment, the housing 110 of the portable computer 100 has a first opening 112 disposed in the bottom of the housing 110, and a second opening 114 disposed at one side surface of the housing 110.

As mentioned above, the first circuit board 120 is disposed in the housing 110, wherein a plurality of connectors, such as a first connector 122, a second connector 124, a third connector 126, a fourth connector 128, and so on, are disposed onto the first circuit board 120. The first connector 122 has, for example, a first connection plug 122a; the second connector 124 has, for example, a second connection plug 124a; the third connector 126 has, for example, a third connection plug 126a; the fourth connector 128 has, for example, a fourth connection plug 128a; and so on. In the embodiment, the connectors can be arranged at the surrounding side of the circuit board 120, for example, the first connector 122 and the second connector 124 are respectively disposed at the two sides of the first circuit board 120, which are perpendicular each other, and the third connector 126 and the fourth connector 128 are disposed at the same side of the first circuit board 120. The connection plugs of the several connectors are disposed in such a way that they toward the second opening 114 and thereby are electrically connected to other electronic devices, and the connection plugs may be a removable media connection port, a parallel port, a serial port, a connection port for a local area network, a D-sub video output port, or S terminal output port, etc.

Continuing to refer to FIG. 1 and FIG. 2, the rotating element 130 has a first portion 132 and a second portion 134, wherein the first portion 132 is pivoted to the housing 110, and a part of the first portion 132 passes through the first opening 112 to be exposed outside the housing 110. The second portion 134 is fixed to the first circuit board 120 and further includes a first joint 132a fixed onto the first circuit board 120, so that the rotating element 130 can be securely fixed onto the first circuit board 120.

Moreover, the portable computer 100 further includes an internal frame 150, disposed on the first circuit board 120 and surrounding the multiple connectors disposed onto the first circuit board 120. The internal frame 150 has a plurality of windows, such as, a first window 152 corresponding to the connection plug 122a of the first connector 122, a second window 154 corresponding to the connection plug 124a of the second connector 124, a third window 156 corresponding to the connection plug 126a of the third connector 126 and a fourth window 158 corresponding to the connection plug 128a of the fourth connector 128, and so on. In the embodiment, the internal frame 150 may be made of conductive material such as metal, etc, and electrically connected to the grounded terminal of the first circuit board 120.

Figure 3A:
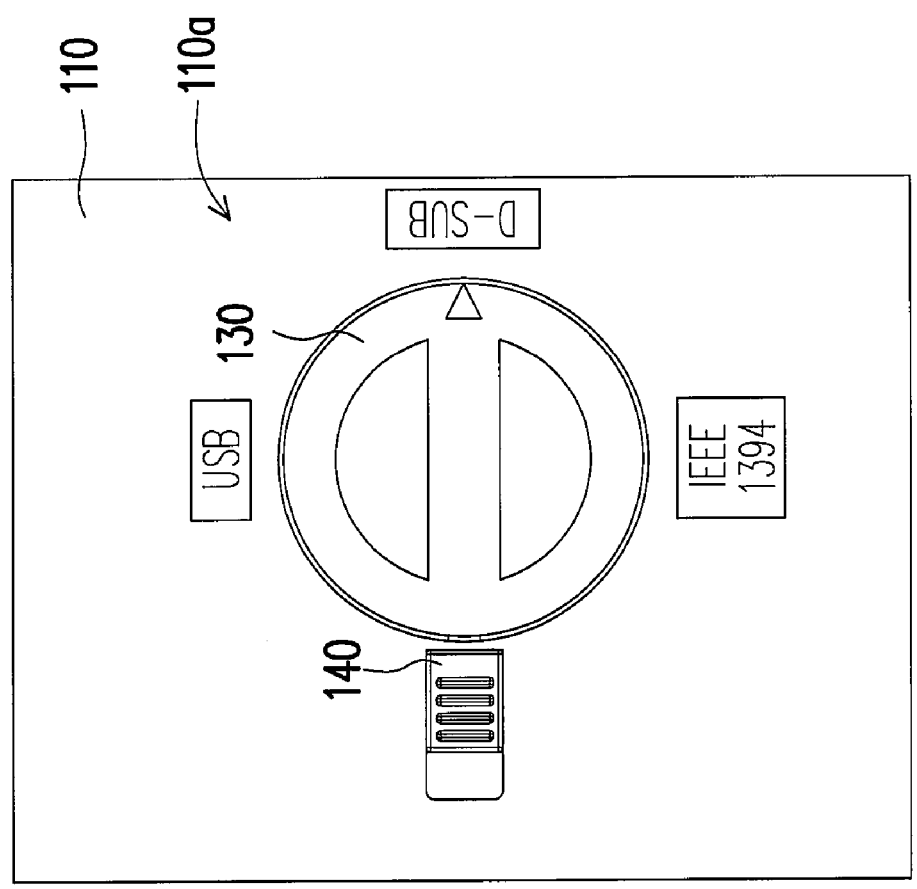
FIG. 3A is a bottom view of a housing shown in FIG. 2.

In addition, referring to FIG. 1 and FIG. 3A, the portable computer 100 further includes a locking element 140 that is slidably disposed or pivoted to the housing 110. The locking element 140 may shift between an unlocked position and a locked position by force, wherein when the locking element 140 is disposed at the locked position, the locking element may lock the rotating element 130 to preventing it from rotating.

To simplify the description, the following takes the first connector 122 and the second connector 124 as an example to describe the embodiment of the present invention, however, the first connector 122 and the second connector 124 can be substituted by other connectors such as a third connector 126, a fourth connector 128, etc. Referring to FIG. 2, when the users want to connect the second device 200, such as a display device, USB mass storage disc or printer, to the portable computer 100 of the embodiment of the present invention, the users can check, through the second opening 114, whether the second connection plug 124a (as shown in FIG. 1) of the second connector 124 disposed in the second opening 114 is suitable for being connected to the second device 200. If the second connection plug 124a is not suitable for being connected to the second device 200, the users can apply force to the locking element 140 to make it leave the locked position and move to the unlocked position, thereby releasing the limitation of the rotating element 130 by the locking element 140 and permitting the rotation of the rotating element 130.

Figure 3B:
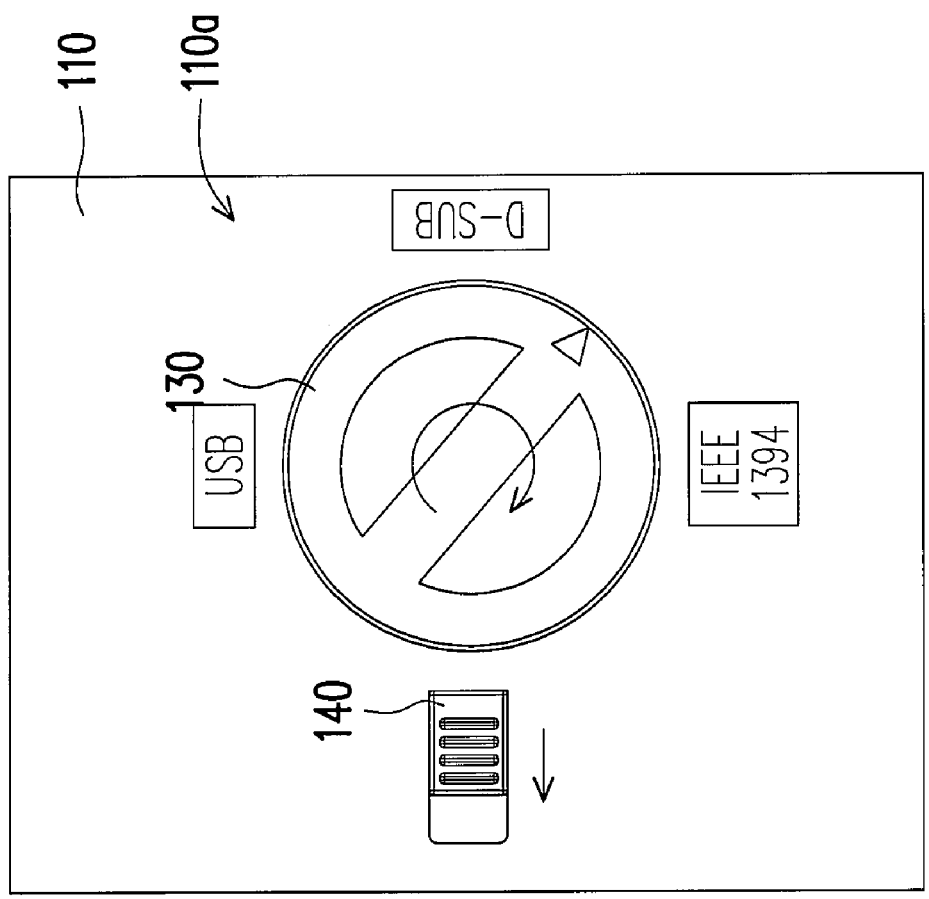
FIG. 3B-3C are schematic diagrams of a locking element in an unlocked position and a locked position, respectively.
Figure 3C:
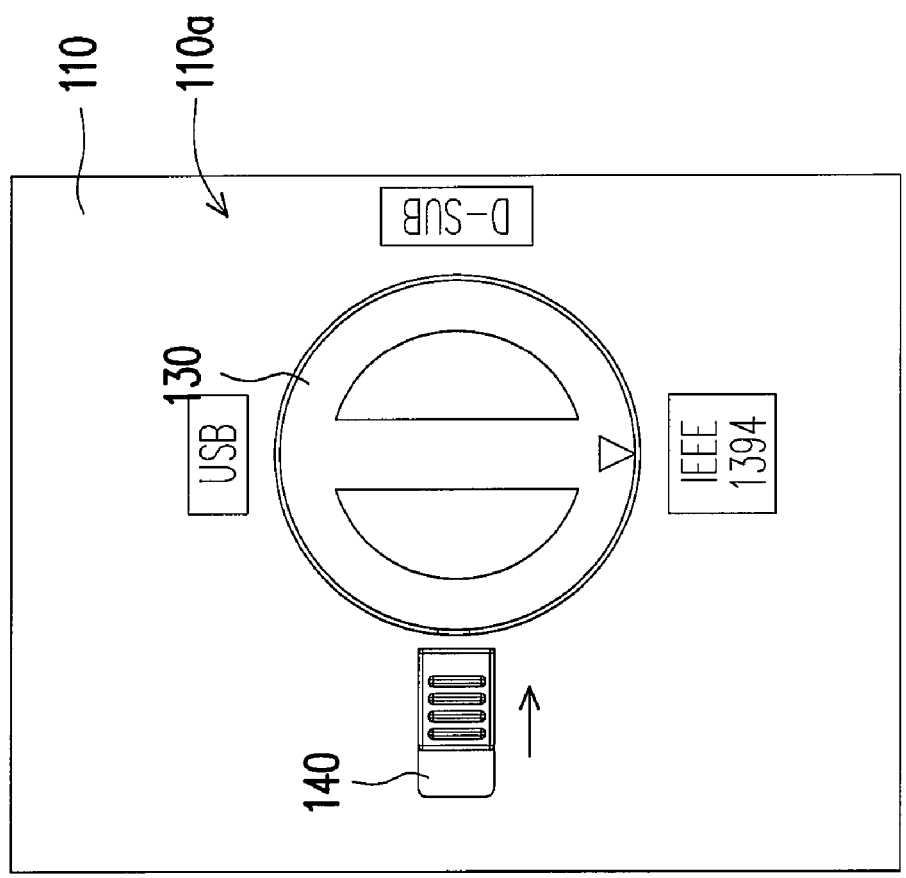

FIG. 3A is a bottom view of the housing shown in FIG. 2, and FIGS. 3B-3C are the schematic diagrams of the locking element in the unlocked position and the locked position, respectively. Taking the lock element 140's being slidably disposed on the housing 110 as an example, when the locking element 140 is located at the locked position, as shown in FIG. 3A, the locking element 140 may lock the rotating element 130 so that the rotating element 130 can not rotate. When the users want to change the exposed connection plug of the connector in the second opening 114, the users may apply force to push the locking element 140 to move it to the unlocked position from the locked position, then, the users again apply force to the rotating element 130 to rotate the rotating element 130, as shown in FIG. 3B.

In particular, when the locking element 140 leaves the locked position, the users may apply force to the rotating element 130, so that the rotating element 130 may bring the first circuit board 120 to rotate with the rotating element 130 relative to the housing 110. Therefore, the second connector 124 disposed onto the first circuit board 120 may leave the second opening 114 due to the rotation of the first circuit board 120, so that the second opening 114 may expose another connection plug, for example, the first connection plug 122a. Thereafter, the user may again check whether the first connection plug 122a is suitable for being connected to the second device 200 (not shown).

When the users make sure their desired first connection plug 122a of the first connector 122 is exposed in the second opening 114, the users can push the lock element 140 back to the locked position to lock the rotation element 130, as shown in FIG. 3C.

Similarly, if the first connection plug 122a is not suitable for being connected to the second device 200, the users may repeat the above steps to select the connection plug of the suitable connector. It can be obviously seen from the above that the portable computer 100 of the embodiment of the present invention can provide more kinds of connectors for customer selection in the limited width than the conventional portable computer. In addition, to help user to select the connection plug more conveniently, a text description can be subscribed in the corresponding position of the bottom 110a (as shown in FIG. 1 or FIG. 3A) of the housing 110, or, drawing a symbol for representing the connection port is also applicable.

Figure 4:
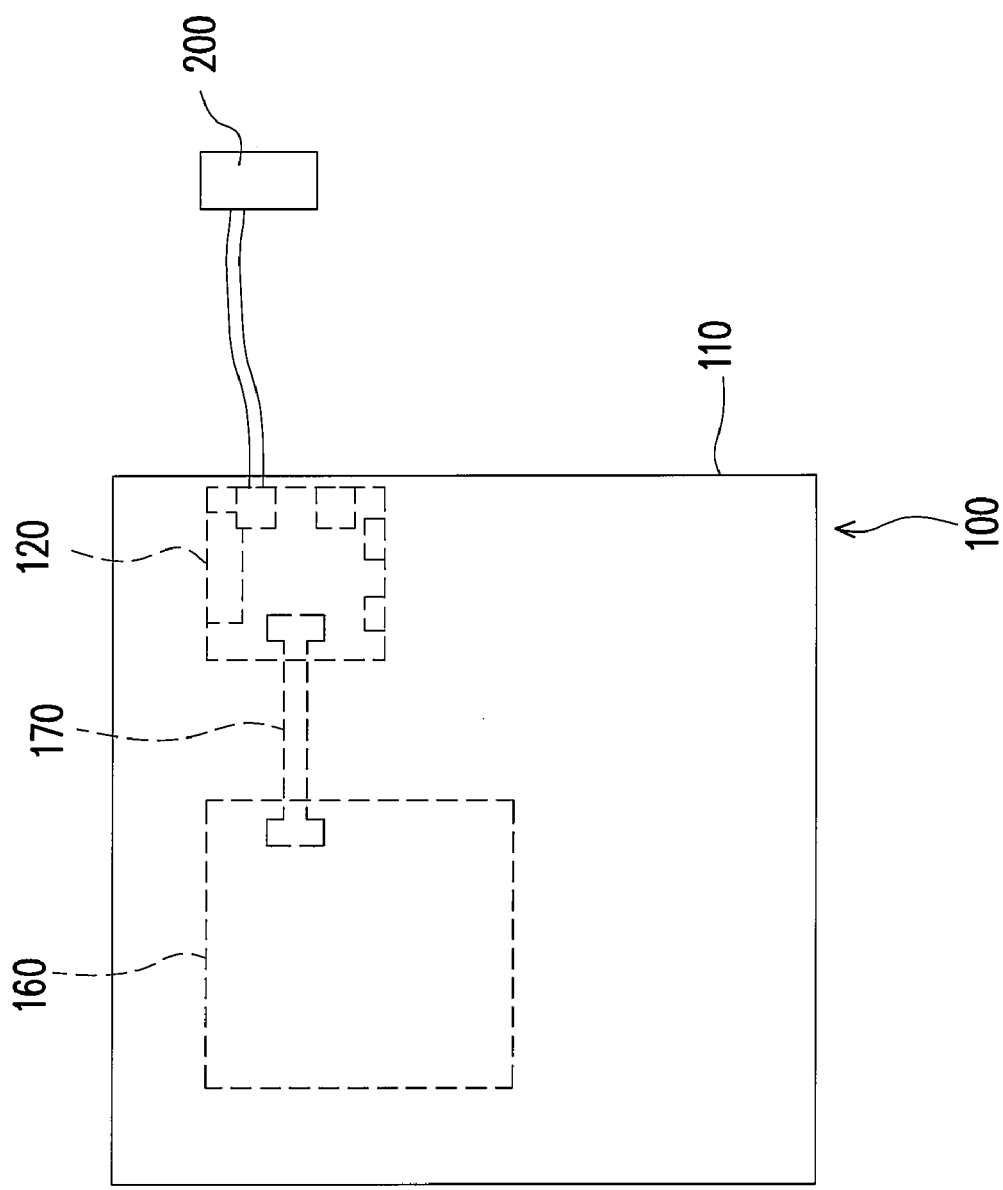
FIG. 4 is a schematic diagram showing that another portable computer is electrically connected to the second device through the first circuit board and the second circuit board.

FIG. 4 is a schematic diagram showing other portable computer is electrically connected to the second device through the first circuit board and the second circuit board. Referring to FIG. 4, the portable computer 100 further includes a second circuit board 160, disposed in the housing 110 and electrically connected to the first circuit board 120 through a transmission cable 170. In the embodiment, the second circuit board 160 is a main board of the notebook computer, and the second circuit board 160 can also be electrically connected to the first circuit board 120 through the flexible bus. After the second device 200 is electrically connected to the first circuit board 120 of the portable computer 100, the data can be transmitted between the second circuit board 160 and the second device 200 through the first circuit board 120. Of course, a plurality of circuit boards can also be disposed in the portable computer 100 of the embodiment of the present invention, and a plurality of connectors are disposed onto all of the circuit boards, therefore the users can electrically connect a plurality of different second devices 200 to the portable computer 100 of the embodiment of the present invention.

In summary, the portable computer of the embodiment of the present invention can accommodate more and more kinds of connectors in its limited width than conventional technologies. The connectors are arranged at the side of the circuit board, and the users can rotate the rotating element to select the desired connector, so that the portable computer of the embodiment of the present invention can provide more and more kinds of connectors to meet the users' desirability.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable computer, comprising
   a housing, having a first opening and a second opening;
   a first circuit board accommodated into the housing, comprising a first connector and a second connector, wherein the first connector and the second connector are disposed onto the first circuit board; and
   a rotating element, having a first portion pivoted to the housing and a part of the first portion passing through the first opening, and a second portion fixed to the first circuit board which rotates with the rotating element relative to the housing, wherein the first connector is located in the second opening when the rotating element is located at a first position, and the second connector is located in the second opening when the rotating element is located at a second position.

2. The portable computer as claimed in claim 1, wherein the second opening is disposed at one side surface of the housing.

3. The portable computer as claimed in claim 1, wherein the second portion further includes a first joint, and the first joint is fixed onto the first circuit board.

4. The portable computer as claimed in claim 1, wherein the portable computer further comprising:
   a locking element, disposed on the housing, wherein the locking element shifts between an unlocked position and a locked position by force, when the locking element is located at the lock position, the locking element locks the rotation element to prevent it from rotating.

5. The portable computer as claimed in claim 4, wherein the locking element is slidably disposed on or pivoted to the housing.

6. The portable computer as claimed in claim 1, further comprising:
   an internal frame, disposed in the first circuit board and surrounding the first connector and the second connector, wherein the internal frame has a first window and a second window respectively exposing the first connection plug of the first connector and the second connection plug of the second connector.

7. The portable computer as claimed in claim 6, wherein the internal frame is conductive and electrically connected to a grounded terminal of the first circuit board.

8. The portable computer as claimed in claim 1, further comprising:
   a second circuit board, disposed in the housing and electrically connected to the first circuit board.

9. The portable computer as claimed in claim 8, further comprising:
   a transmission cable, disposed in the housing, wherein the second circuit board is electrically connected to the first circuit board through the transmission cable.

10. The portable computer as claimed in claim 1, wherein the first connector and the second connector are respectively disposed at a first side and a second side of the first circuit board, and the first side is perpendicular to the second side.

* * * * *